(12) United States Patent
Mackin et al.

(10) Patent No.: US 8,775,788 B2
(45) Date of Patent: *Jul. 8, 2014

(54) METHOD AND SYSTEM FOR AUTOMATICALLY TRANSITIONING OF CONFIGURATION SETTINGS AMONG COMPUTER SYSTEMS

(75) Inventors: Kenneth J. Mackin, Beaverton, OR (US); Gordon A. Rielly, Chesterville (CA); Mark C. Chweh, Beaverton, OR (US)

(73) Assignee: Tranxition Corporation, Portland, OR (US)

(*) Notice: Subject to any disclaimer, the term of this patent is extended or adjusted under 35 U.S.C. 154(b) by 91 days.

This patent is subject to a terminal disclaimer.

(21) Appl. No.: 12/781,721

(22) Filed: May 17, 2010

(65) Prior Publication Data

US 2011/0093570 A1    Apr. 21, 2011

Related U.S. Application Data

(63) Continuation of application No. 12/029,876, filed on Feb. 12, 2008, now abandoned, which is a continuation of application No. 10/796,571, filed on Mar. 9, 2004, now Pat. No. 7,346,766, which is a continuation of application No. 10/319,437, filed on Dec. 13, 2002, now Pat. No. 6,728,877, which is a continuation of application No. 09/300,862, filed on Apr. 28, 1999, now abandoned.

(51) Int. Cl.
  *G06F 15/177* (2006.01)

(52) U.S. Cl.
  USPC .............................................. 713/100; 713/1

(58) Field of Classification Search
  None
  See application file for complete search history.

(56) References Cited

U.S. PATENT DOCUMENTS

| 6,110,229 | A | * | 8/2000 | Yamaguchi | 717/178 |
| 6,161,176 | A | * | 12/2000 | Hunter et al. | 713/1 |
| 6,728,877 | B2 | * | 4/2004 | Mackin et al. | 713/100 |
| 7,346,766 | B2 | * | 3/2008 | Mackin et al. | 713/100 |

* cited by examiner

*Primary Examiner* — Dennis M Butler
(74) *Attorney, Agent, or Firm* — Ascenda Law Group, PC

(57) ABSTRACT

A method and system for automatically transitioning configuration settings among computer systems. Multiple configuration settings comprising a computer "personality" are located on a source computing system using multiple transition rules from a personality object. The computer personality includes customization choices, data files, electronic mail, system preferences, application customization choices, the network environment, browser information, etc. The configuration settings are extracted from multiple locations on the source computing system. The multiple extracted configuration settings are stored in a pre-determined transition format. The multiple extracted configuration settings are manipulated. A transition package is created from the multiple manipulated configuration settings. The transition package includes the multiple manipulated configuration settings. The transition package is sent to a target computing system. The transition package is infused on the target computing system to automatically transition configuration settings from the source computing system to the target computing system. The method and system may vastly reduce transition, configuration and deployment times for service providers, corporations, and end-users when a new computing system is deployed.

1 Claim, 8 Drawing Sheets

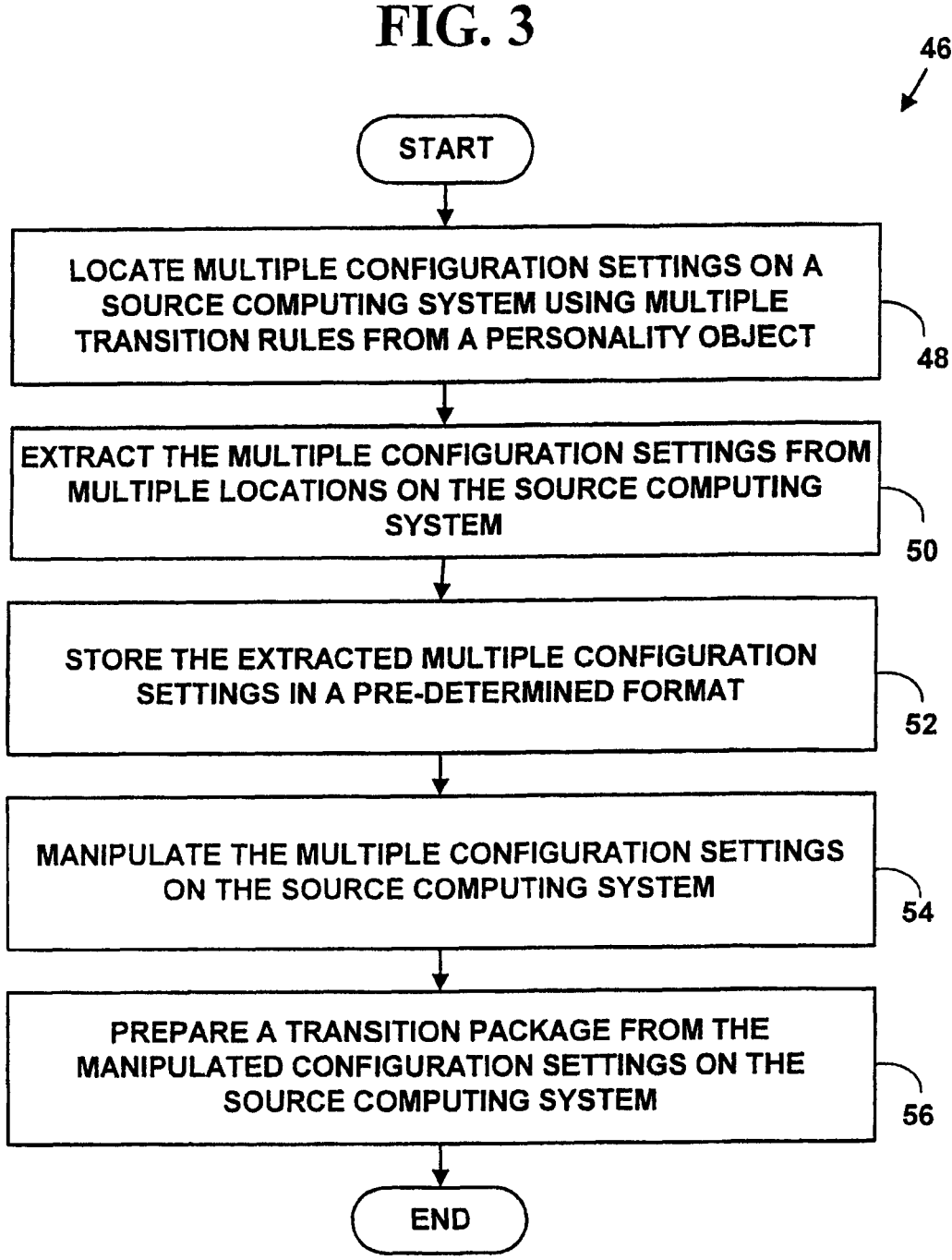

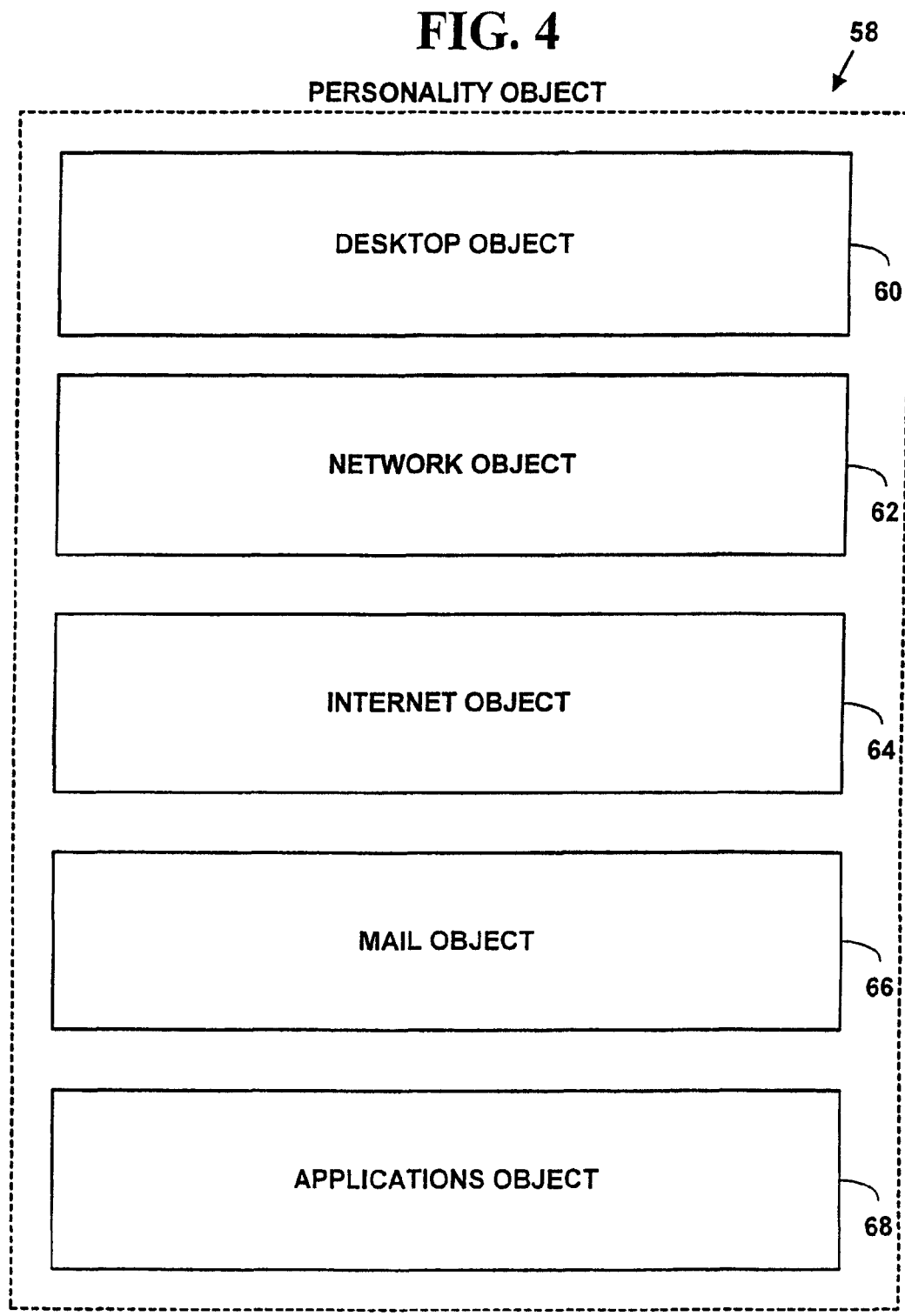

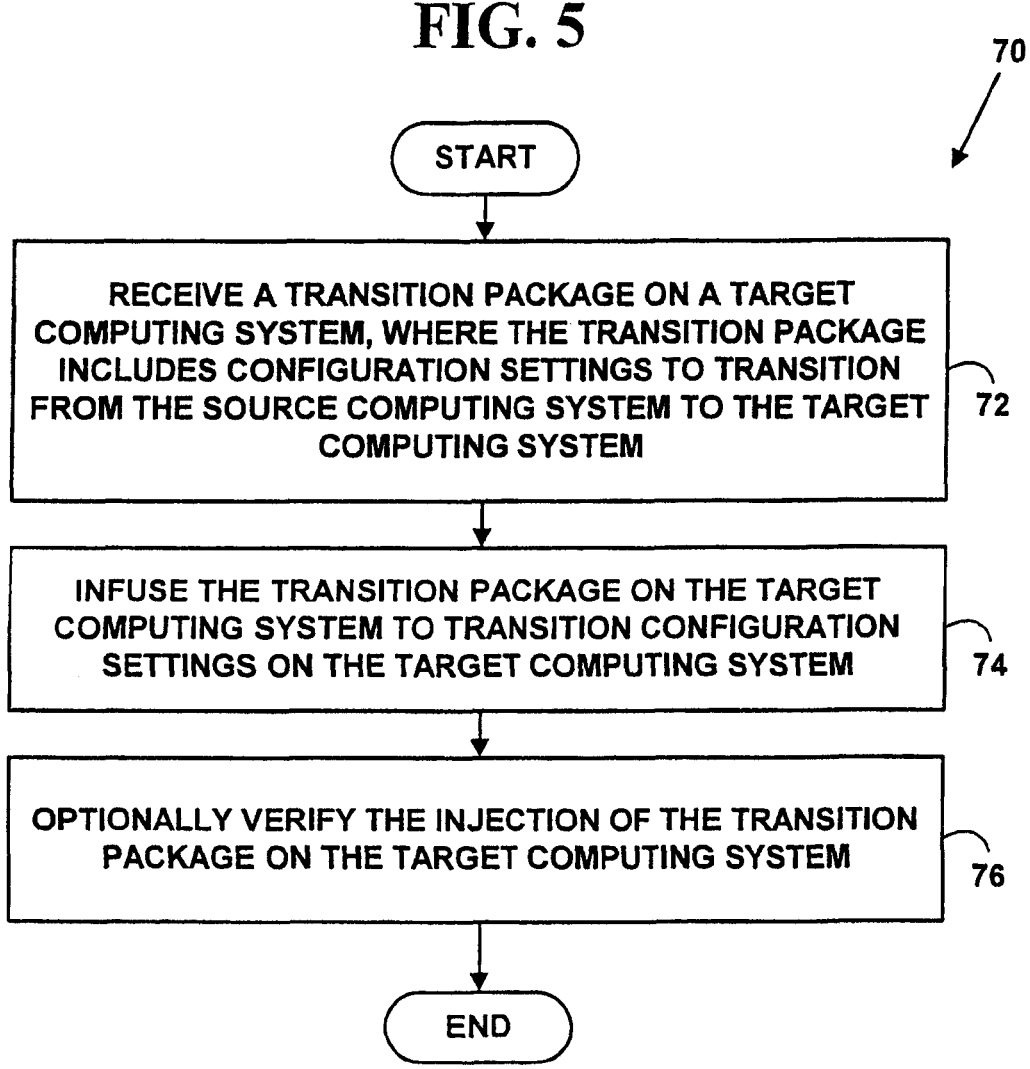

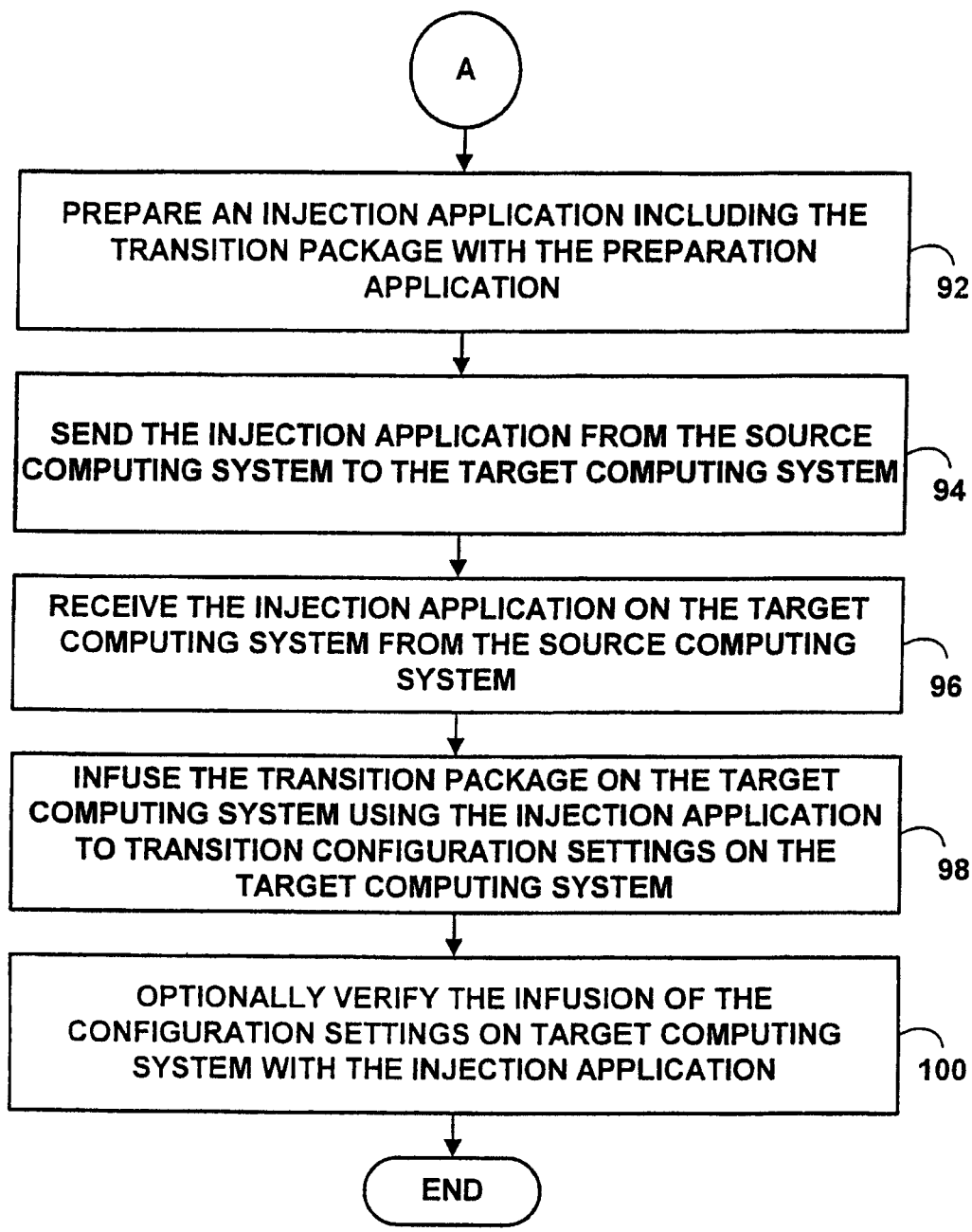

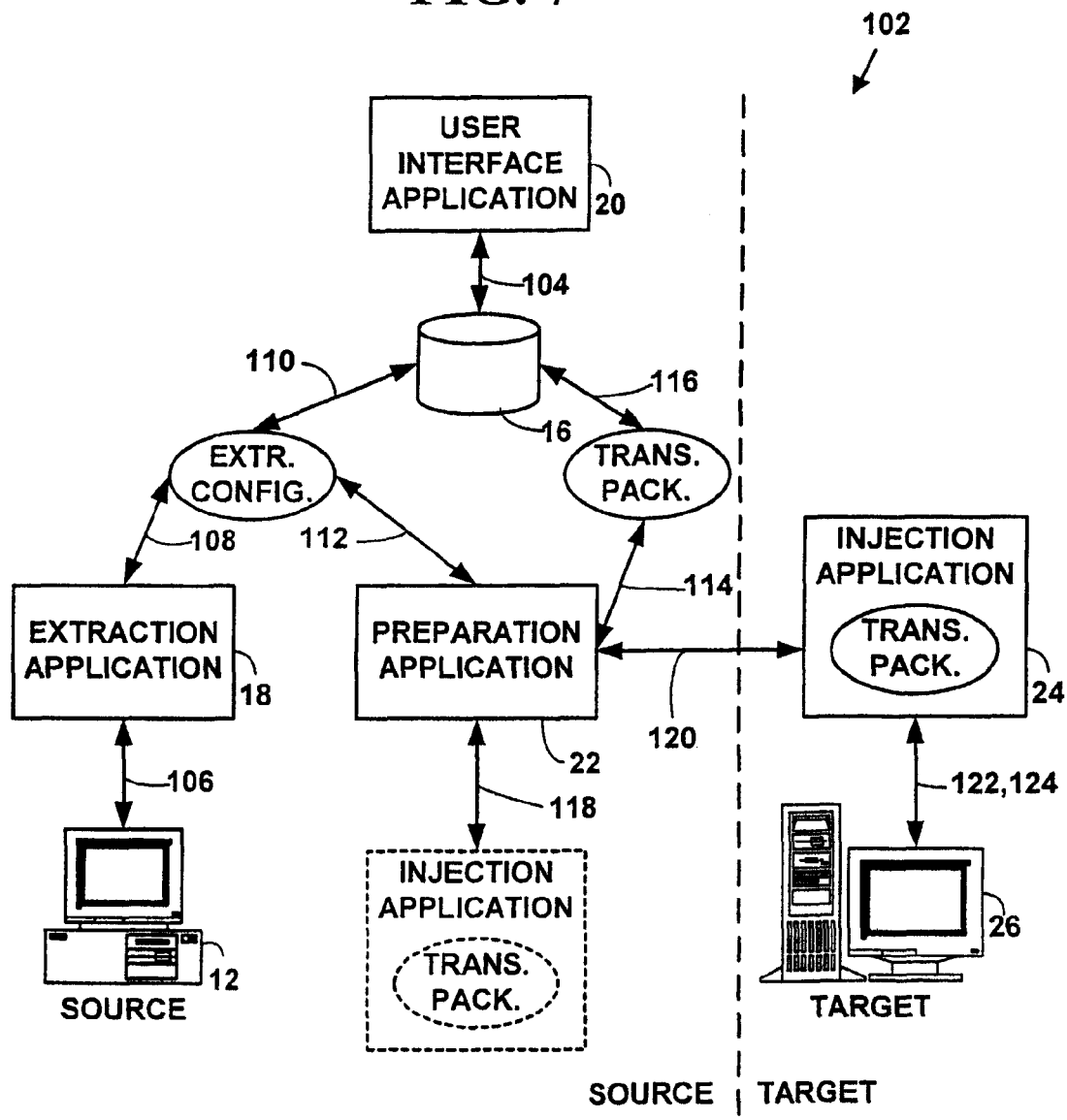

METHOD AND SYSTEM FOR AUTOMATICALLY TRANSITIONING OF CONFIGURATION SETTINGS AMONG COMPUTER SYSTEMS

FIELD OF THE INVENTION

The present invention relates to configuration of computers. More specifically, it relates to a method and system for automatic transitioning of configuration settings among computer systems.

BACKGROUND OF THE INVENTION

In today's world, where technology changes very quickly, it is very common to replace an old computer system every few years with a new computing system. It has been estimated that approximately 90,000,000 personal computers are sold each year, with approximately 90% of the sales comprising new computing systems to replace old computing systems. The new computing systems typically include more memory, larger hard-disks, faster central processing units, better quality monitors, updated versions of operating systems, new software applications and other improved features.

Any old computer system typically includes a large number of configuration settings that have been added and/or customized by a user or a network manager. The configuration settings may include Internet settings, modem or other network settings, dial-up phone numbers, a desktop "look and feel," file system folders settings, application settings, folder names and locations, macros and editing options, custom dictionaries, electronic mail ("e-mail") address books, inboxes, passwords, subscriptions, certificates and other configurations or setting customized by a user or a network manager, or other configuration parameters used over time such as cookies, etc.

There are several problems associated with making a transition from an old computing system to a new computing system. First, there is currently no easy way to determine what configuration settings a user or a network administrator may have customized, since there is no one central location where such configuration files are stored. Operating systems and other hardware and software applications typically have unique directories and unique file names to store configuration files and settings. These unique directories and configuration files can exist virtually anywhere on an old computer system. Trying to collect configuration settings is a difficult task. The average user or network administrator may have to spend large amounts of time reading documentation or help screens to figure out where the configuration files are stored for any given application.

Another problem is that there is no easy way to collect and store heterogeneous configuration settings when they are located. The operating system and applications typically use unique data layouts and data storage features that do not allow for homogenous collection and storage.

Another problem is that there is no easy way to transfer old configuration settings to a new computing system. When a new computer system is used, a user or a user's agent typically has to re-configure the new computing system to include configuration settings that were used on an old computer system. All but the most rudimentary pieces of "the migration process" are done by hand. This requires many hours of hands-on time, with lost productivity and a "start from scratch" resignation. Many users often decide to stick with an obsolete old computer system rather than wrestle migration and manual re-configuration required for a new computing system.

Yet another problem is that configurations settings on an old computing system may be stored in a new location, in a new file, or in new format on a new computing system. An old configuration setting may have to be translated or otherwise modified to provide the same results on the target computing system. Such translation and/or modifications are typically completed by hand and are prone to errors that lead to user frustration.

Yet another problem is that the migration to a new computing system typically requires training on new features of new target computing system before migration can take place. This training often delays the migration process. In addition, a manual migration process used without adequate training on the new computing system can decrease quality of service on the new computing system since one or more configuration settings may be missed on the old computing system and not be transferred to the new computing system.

Yet another problem is the Year 2000 ("Y2K") problem, which may force companies to quickly migrate large numbers of computing systems to new technology before the year 2000. The issues of migration in the face of a Y2K breakdown is a daunting problem by itself. A manual migration process acts to increase the complexity of the Y2K problem.

Thus, it is desirable to automatically determine configuration settings customized by a user or a network administrator on an old computing system. It is also desirable to provide an automatic migration of configuration settings from an old computing system to a new computing system without using a time consuming manual migration process.

SUMMARY OF THE INVENTION

In accordance with preferred embodiments of the present invention, some of the problems associated with transferring configuration settings from an old computer system to a new computer system are overcome. A method and system for automatically transitioning configurations among computer systems is provided. One aspect of the invention includes a method for automatically transitioning configuration settings from source (i.e., old) computing system to a target (i.e., new) computing system.

This method includes locating multiple configuration settings on a source computing system using multiple transition rules from a Personality object. The multiple configuration settings are extracted from a multiple locations on the source computing system. The multiple extracted configuration settings are stored in a pre-determined transition format on the source computing system. The multiple extracted configuration settings stored in the pre-determined transition format are manipulated. A translation package is prepared from the multiple manipulated configuration settings stored in the pre-determined transition format. The translation package is used to transfer the multiple manipulated configuration settings from the source computing system to a target computing system.

The translation package is transferred to a target computing system, or stored as an intermediate step in the transition process. The translation package may also be created stored on an intermediate computing system. The translation package is infused on the target computing system to transition configuration settings from the source computing system to the target computing system. The configuration settings in the translation package may be optionally verified to ensure that the configuration settings have been correctly applied to the target computing system.

Another aspect of the invention includes an automatic transition system. The system comprises a database, and extraction application, a preparation application, an injection application and a user interface application. However, more or fewer system components could also be used and the present invention is not limited to the system components described.

The database is used for storing configuration settings extracted from a source computing system, manipulated configuration settings from a source computing system, and transition packages to transition configuration settings from a source computing system to a target computing system. The database may include data stored in a database format or in other formats such as a data structure format, a file format, or other volatile or non-volatile formats. The extraction application is used for locating and extracting configuration settings on a source computing system for transition to a target computing system. The preparation application is used for manipulating configuration settings extracted from a source computing system and for preparing a transition package. The injection application is used for infusing manipulated configuration settings from a transition package to transition configuration settings from a source computing system to a target computing system. The user interface application is used for preparing an extraction plan and a transition plan to extract and transition configuration settings from a source computing system for a target computing system.

The method and system provide an automated transition process for transition configuration settings from a target computing system to a host computing system. The method and system may vastly reduce transition, configuration and deployment times for service providers, corporations, and end-users for transitions from a target computing system to source computing system. The method and system may save time, resources, improve transition quality, and reduce user frustration.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 3 is a flow diagram illustrating a method for automatically determining transition configuration settings from a source computing system for a target computing system;

FIG. 4 is a block diagram illustrating components of a Personality object;

FIG. 5 is a flow diagram illustrating a method for automatically applying determined transition configuration settings;

FIGS. 6A and 6B are flow diagrams illustrating a method for automatically transitioning configuration settings; and FIG. 7 is a block diagram illustrating a data flow for the automatic configuration setting transition method of FIGS. 6A and 6B.

DETAILED DESCRIPTION OF PREFERRED EMBODIMENT

Exemplary Transition System

Figure 1:
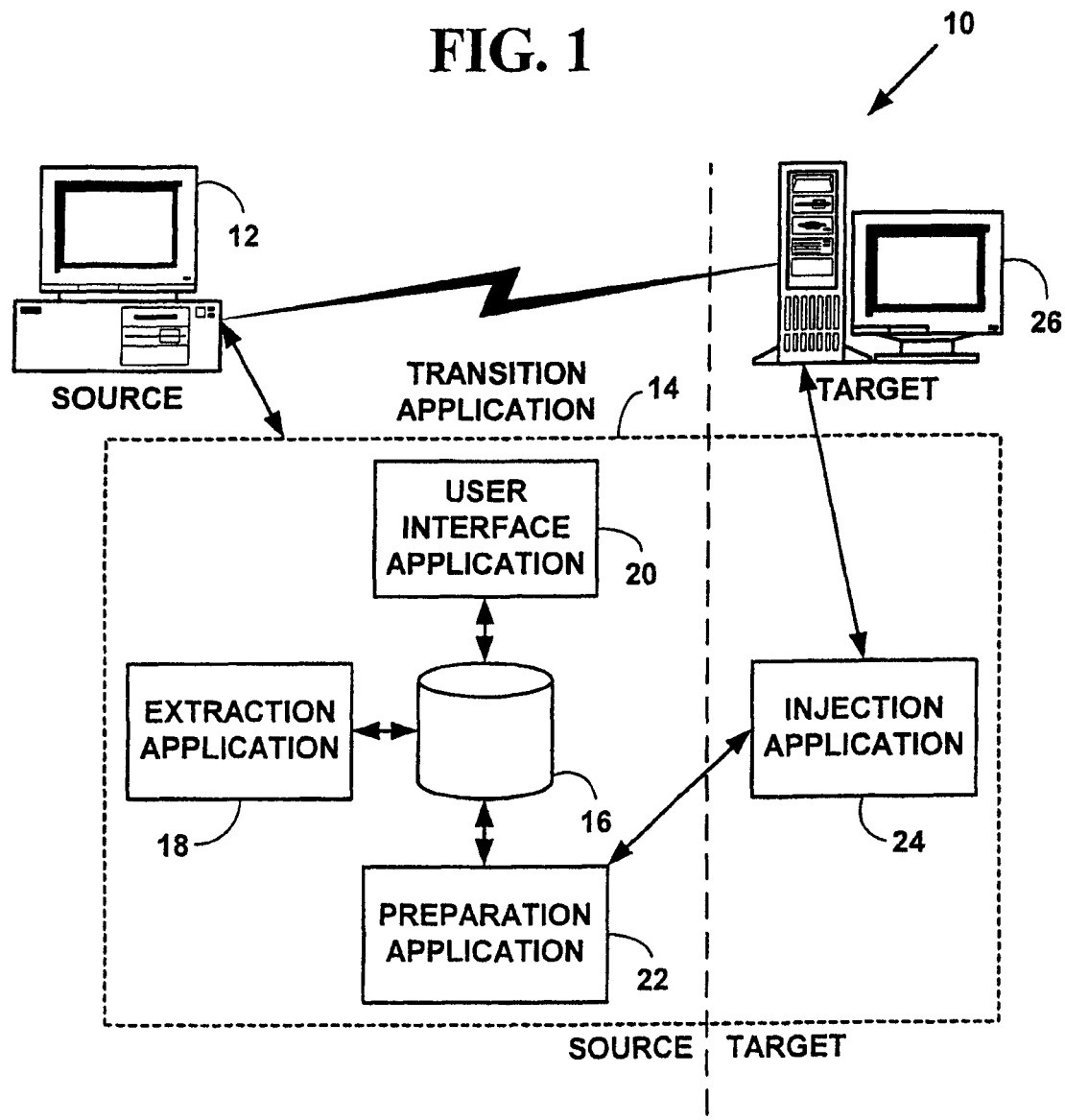
FIG. 1 is a block diagram illustrating an exemplary translation system.

FIG. 1 is a block diagram illustrating an exemplary transition system 10 for automatically transitioning configuration settings from a source (i.e., old) computing system to a target (i.e., new) computing system. The transition system 10 includes a source computing system 12. The source computing system 12 includes a Transition application 14. The Transition application 14 comprises: a database 16, an Extraction application 18, a User Interface application 20, and a Preparation application 22. The Transition application 14 further comprises an Injection application 24 that is sent to a target computing system 26. However, more or fewer components could also be used in the transition system 10, including intermediate computing systems between the source computing system 12 and the target computing system 26, and the present invention is not limited to the components illustrated in FIG. 1.

In one exemplary preferred embodiment of the present invention, the database 16 is used for storing configuration settings extracted from the source computing system 12, manipulated configuration settings and transition packages to transition configuration settings from the source computing system 12 to a target computing system 26. The database 16 may include data stored in a database format or in other formats such as a data structure format, a file format, or other volatile or non-volatile storage formats. The Extraction application 18 is used for locating and extracting configuration settings on the source computing system 12 to transition to the target computing system 26. The User Interface application 20 is used for preparing an extraction plan and a transition plan to extract and transition configuration settings from the source computing system 12 to the target computing system 26. The Preparation application 22 is used for manipulating configuration setting extracted from the source computing system 12 and for preparing a transition package. The transition package is used to transition configuration settings from the source computing system 12 to the target computing system 26. The Injection application 24 is used for infusing manipulated configuration settings from a transition package to transition configuration settings from the source computing system 12 to a target computing system 26. However, the present invention is not limited to the functionality described for the transition applications, and the transition applications can include more or less functionality. The transition applications are explained in detail below.

In one embodiment of the present invention, the Transition application 14 including the database 16, the Extraction application 18, the User Interface application 20, and the Preparation application 22 without the Injection application 24 reside on the source computing system 12. This is illustrated in FIG. 1 by the dashed line dividing source and target components of the Transition application 14. In such an embodiment, only the Injection application 24 resides on the target computing system 26.

In another preferred embodiment of the present invention, a Transition application 14 including a database 16, an Extraction application 18, a User Interface application 20, and a Preparation application 22, and an Injection application 24 resides on both the source computing system 12 and the target computing system 26 (not illustrated in FIG. 1).

In another preferred embodiment of the present invention, the source computing system 12 only temporarily includes the Transition application 14. That is, the Transition application 14 is not installed on any non-volatile storage on the source computing system 12. The Transition application 14 only "resides" in volatile storage (e.g., Random Access Memory ("RAM")) on the source computing system 12 during the extraction and preparation portion of the transition process. The target computing system 26 may also only temporary include the Injection application 24. The Injection application 14 may also only reside in volatile storage on the target computing system 26 during the injection portion of the translation process.

In yet another embodiment of the present invention, components of the Transition application 14 may only exist on a "third" computing system and not on either the source computing system 12 or the target computing system 26. Additional software applications may be used only to retrieve and only to inject settings and such software applications would be present only on the source computing system 12 or the target computing system 26 and coordinated from the third computing system. In yet another embodiment of the present invention, computer hardware or firmware may be employed in such a manner that configuration settings are extracted and injected without a software Transition application 14 existing on the source computing system 12 or the target computing system 26.

In yet another preferred embodiment of the present invention, the source computing system 12 may only include the Extraction application 18. The other components of the Transition application 14 reside on one or more other computing systems and can be used in a distributed fashion. Extracted transition data can also be stored on the one or more other computing systems using distributed computing.

An operating environment for the computing systems 12, 26 of the present invention include a processing system with one or more high speed Central Processing Unit(s) ("CPU") and a memory system. In accordance with the practices of persons skilled in the art of computer programming, the present invention is described below with reference to acts and symbolic representations of operations or instructions that are performed by the processing system. Such acts and operations or instructions are referred to as being "computer-executed" or "CPU executed."

The CPU can be either electrical or biological. The acts and symbolically represented operations or instructions include the manipulation of electrical signals or biological signals by the CPU. An electrical system or biological system represents data bits that cause a resulting transformation or reduction of the electrical signals or biological signals. The maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, electrical memory, organic memory, and any other volatile (e.g., Random Access Memory ("RAM")) or non-volatile (e.g., Read-Only Memory ("ROM") a hard disk, etc.,) mass storage system readable by the CPU. The computer readable medium includes cooperating or interconnected computer readable medium, which exist exclusively on the processing system or be distributed among multiple interconnected processing systems that may be local or remote to the processing system.

Exemplary Transition Architecture

Figure 2:
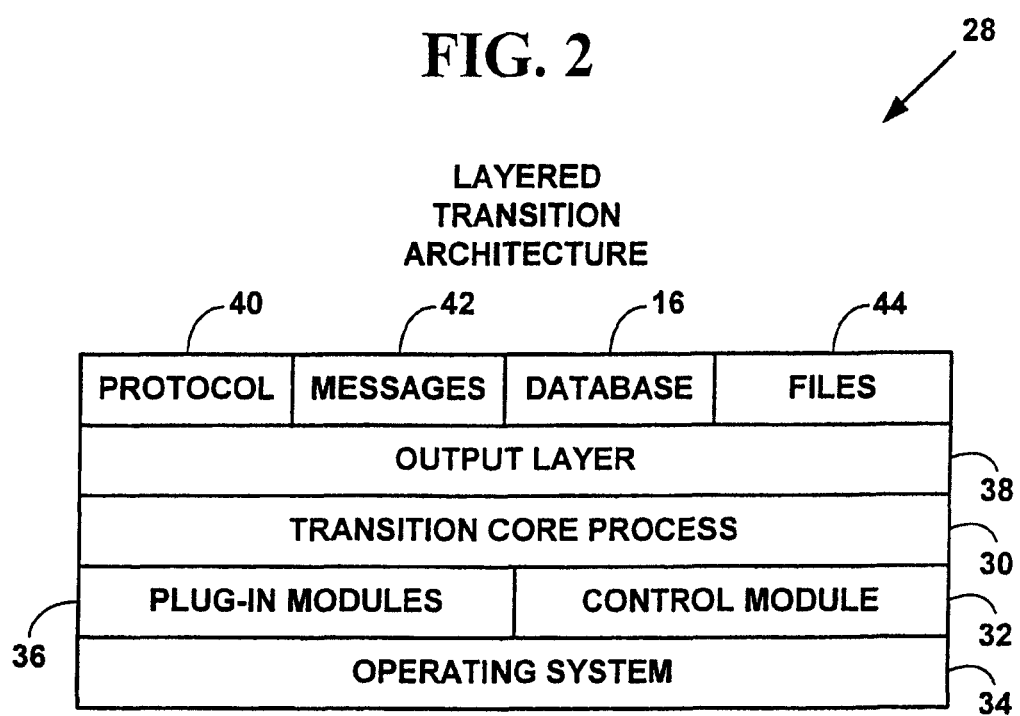
FIG. 2 is a block diagram illustrating an exemplary layered transition architecture.

FIG. 2 is a block diagram illustrating an exemplary layered transition architecture 28 for the Transition application 14 of FIG. 1. The Transition application 14 resides in a transition core process 30. The transition core process 30 includes a control module 32 that is an interface to an operating system 34. The operating system 34 can be a windowed operating system such as Windows 95/98/NT by Microsoft Corporation of Redmond, Wash., and other windowed or non-windowed operating systems can also be used (e.g., Linux). The transition core process 30 uses plug-in modules 36 to interface to the operating system 34 and to process configuration settings from the source computing system 12. The plug-in modules 36 also allow additional modules to be added to provide new and enhanced functionality for the transition core process 30. The plug-in modules 36 are explained below (See FIG. 4).

In one exemplary preferred embodiment of the present invention, a first transition core process 30 on the source computing system 12 controls the Extraction application 18 (FIG. 1), the User Interface application 20 (FIG. 1), and the Preparation application 22 (FIG. 1). The operating system 34 on the target computing system 26 controls execution of the Injection application 24 on the target computing system 26 (e.g., the Injection application 24 is an executable file (.EXE)). In another exemplary preferred embodiment of the present invention, a first transition core process 30 on the source computing system 12 controls the Extraction application 18, the User Interface application 20, and the Preparation application 22. A second transition core process 30 on the target computing system 12 controls a first Injection application 24 on the target computing system 26.

In one exemplary preferred embodiment of the present invention, the transition core process 30 includes an Application Programmer's Interface ("API"). The transition API allows other applications to call transition application functions (e.g., Hyper Text Markup Language ("HTML"), Java, Visual Basic, Visual Basic Scripts, C++, Visual C++, etc.). The transition API also includes functions for low level Input/Output ("I/O"), high level I/O, and smart I/O. The low level I/O includes functions for file system I/O, database 16 interaction, transition specific I/O, operating system registry I/O, etc. The high level I/O includes retrieval of configuration settings, storage of configuration settings, etc. The smart I/O includes smart configuration setting searching capabilities, smart copying capabilities, etc.

The transition core process 30 includes an output layer 38, a protocol layer 40, a message layer 42, a database 16 and a file layer 44. The output layer 38 is used for the various types of I/O as was described above. The protocol layer 40 allows the transition core process 30 to use protocols such as Hyper Text Transfer Protocol ("HTTP"), File Transfer Protocol ("FTP"), User Datagram Protocol ("UDP"), Transmission Control Protocol ("TCP"), Internet Protocol ("IP") and other protocols to communicate with the source computing system 12 and the target computing system 26. The message layer 42 is used for electronic mail ("e-mail") and other communications with the operating system 34 and the source computing system 12 and the target computing system 26.

The database 16 includes objects used to locate configuration settings on the source computing system. The database 16 may be temporary storage such as RAM, or permanent storage such as a floppy disk, hard disk, re-writeable, CD-ROM, Flash memory, Flash-ROM, or other non-volatile computer readable media. The file layer 44 includes configuration settings extracted from the source computing system 12. The file layer 44 allows files to be create created and retrieved across file volumes including local and remote file systems. However, more or fewer layers could also be, used in the translation architecture 28. The present invention is not limited to the architecture layers illustrated in FIG. 2.

Automatic Transition of Configuration Settings

FIG. 3 is a flow diagram illustrating a Method 46 for automatically transitioning configuration settings from a source computing system to a target computing system. At Step 48, multiple configuration settings are located on a source computing system using multiple transition rules from a Personality object. At Step 50, multiple configuration settings are extracted from multiple locations on the source computing system. At Step 52, the multiple extracted configuration settings are stored in a pre-determined transition format. At Step 54, the multiple extracted configuration settings stored in the pre-determined transition format are manipulated. At Step 56, a transition package is created from the multiple manipulated configuration settings. The transition package includes the multiple manipulated configuration settings. The transition package is sent from the source computing system to the target computing system or stored as an intermediate step in the transition process. The transition package may also be stored on one or more intermediate computing systems, local or remote to the source computing system or the target computing system. The transition package is infused on the target computing system to transition configuration settings from the source computing system to a target computing system.

Preferred embodiments of the present invention use object-oriented programming techniques. However, non-object-oriented programming techniques could also be used. As is known in the art, an "object type," also called an "object class," comprises a data-type, services that operate on instances of the data type, and a set of object attributes in an object-oriented data-structure. An "object attribute" is a field of data in an object that partially defines that object's state. An "object service" implements and manipulates objects, usually by reading or changing the object attributes. "Object-oriented design" is a software development technique in which a system or component is expressed using objects.

An object typically is an object-oriented data-structure that has two components: a function table, containing a pointer to each "object member" or member function (i.e., sometimes known as an "object method") defined in the object's class, an events table, for accepting events (e.g., OLE or ActiveX control events) and a data block, containing the current values for each object variable (i.e., data members, sometimes known as an "object property"). A computer software application has some reference to an object through an object pointer. A computer software application obtains this object reference by using some type of function call (direct or implied) in which that function allocates an object block in computer memory, initializes the function table, and returns a reference to allocated computer memory to an application. The computer memory may be local or distributed on a remote computer.

The Component Object Model ("COM") and Distributed Component Object Model ("DCOM") are models used for object-oriented programming and known to those skilled in the art. The COM and DCOM specify how objects within a single application or between applications (e.g., client/server applications) interact and communicate by defining a set of standard interfaces. Interfaces are groupings of schematically related functions through which a client application accesses the services of a server application.

Object Linking and Embedding ("OLE") controls, such as OLE controls and ActiveX Controls by the Microsoft Corporation of Redmond, Wash., are based in part on the Component Object Model and allow the creation of objects of different formats which operate on data through defined interfaces, rather than operating on the applications responsible for the data. ActiveX is based in part on OLE technologies. An OLE or ActiveX control is an object that accepts and responds to events, such a selection by a mouse or a key on a keyboard, or a selection by another object-oriented member function. Detailed information on the OLE object interface can be found in *Inside OLE,* 2nd edition, by Kraig Brockschmidt, Microsoft Press, Redmond Wash., 1995 which is incorporated herein by reference.

In an exemplary preferred embodiment of the present invention, at Step 48, multiple configuration settings are located on the source computing system 12 using multiple transition rules from a Personality object. In an exemplary preferred embodiment of the present invention, the Personality object includes five object-oriented plug-in modules 36. However, more or fewer object-oriented plug-in modules 36 could also be used.

Translation Personality Object

FIG. 4 is a block diagram illustrating components of a Personality object 58. The Personality object 58 includes a Desktop object 60, a Network object 62, an Internet object 64, a Mail object 66 and an Application object 68. However, more or fewer objects could also be used in the Personality object 58. The objects include information about configuration settings such as location, name, associated sub-settings, etc. In an exemplary preferred embodiment of the present invention, the objects 60, 62, 64, 66, 68 in the Personality object 58 are object-oriented objects. However, non-object oriented objects could also be used in the Personality object 58. The Personality object 58 and related objects 60, 62, 64, 66, 68 comprise object classes that include one or more object members and a data block as was described above.

In one exemplary preferred embodiment of the present invention, the Desktop object 60 includes user preferences that affect the appearance and operation of a basic windowed user interface. Exemplary configuration settings included in the Desktop object 60 are illustrated in Table 1. However, more or fewer configuration settings can also be used in the Desktop object 60, and the present invention is not limited to the configuration settings illustrated in Table 1.

TABLE 1

Desktop Object 60

Visual Elements
    Fonts including meta data colors, themes, sounds, password
wall paper, screen savers, metrics, etc.
  Accessibility Elements
    Settings that disable accessibility to the source computing
    system 12
  User Interface Hardware Settings
    Display resolutions, mouse trails, keyboard mappings, character
    settings, etc.
  Regional Settings
    Time zones, data formats, language, currency settings, etc.
  Windows Preferences
    Start menus, desktop shortcuts, document and run commands, etc.
  Registry Settings The Network object 62 includes configuration settings that enable functionality within a private network of computers such as a Local Area Network ("LAN") or an intranet. In one exemplary preferred embodiment of the present invention, the Network object 62 may not include hardware configuration settings. The Network object 62 may instead include configuration settings that configure the operating system 34, that in turn are mapped to underlying hardware on the source computing system 12. In another exemplary preferred embodiment of the present invention, the network object 62 may include hardware settings.

Exemplary configuration settings included in the Network object 62 are illustrated in Table 2. However, more or fewer configuration settings can also be used in the Network object 62, and the present invention is not limited to the configuration settings illustrated in Table 2.

TABLE 2

Network Object 62

Service Providers
    Name, network addresses (e.g., IP address), dial-up numbers, etc.
Services
    Network services, etc.
Clients
    Proxies, network servers, etc.
Domains
    Domain names and subnets, workgroups
Protocols
    TCP, UDP, IP, HTTP, FTP, etc.
Registry Settings The configuration settings from the Network Object 62 are applied to the target computing system 26 within the context of operating system 34 services available on the target computing system 26. In one exemplary preferred embodiment of the present invention, the Network Object 62 will not install configuration settings for network applications that are not available on the target computing system. For example, if the source computing system 12 has TCP/IP installed, the Network Object 62 will locate and extract relevant TCP/IP settings from the source computing system 12. If the target computing system does not have TCP/IP installed, the Network Object 62 will not automatically transition the TCP/IP settings from the source computing system 12, since the TCP/IP settings can not be used. In another embodiment of the present invention, if the source computing system 12 has configuration settings for a network application that is not installed on the target system (e.g., TCP/IP) the network application will be installed on the target computing system and the appropriate configuration settings will then be applied.

Another feature of the Network Object 62 is to allow a user to review and edit configuration settings before they are applied to the target computing system 26. For example, a network address (e.g., an IP address) extracted from the source computing system may or may not be appropriate for the target computing system, since the target computing system may be installed on a different computer network. Thus, the user can review and edit the configuration settings before they are applied to the target computing system 26.

The Internet Object 64 includes configuration settings that are relevant to the public network of computers provided by the Internet. As is known in the art, the Internet is a worldwide network of inter-connected computers. Exemplary configuration settings included in the Internet object 64 are illustrated in Table 3. However, more or fewer configuration settings can also be used in the Internet object 64, and the present invention is not limited to the configuration settings illustrated in Table 3.

TABLE 3

Internet Object 64

Accounts
    Internet service provider accounts, logins, passwords, etc.
Internet Browser
    Internet Explorer, Netscape Navigator, etc.

TABLE 3-continued

Internet Object 64

Internet browser options
    Favorites, addresses (i.e., Uniform Resource Locators ("URL's"),
        cookies, bookmarks, histories, newsgroup filters, security settings,
        channels, certificates, etc.
Dial-up networking settings
    Dial-up numbers, login names, passwords, etc.
Network addresses
    IP addresses, etc.
Registry settings The Mail object 66 includes configuration settings for electronic mail ("e-mail") and other communication messaging used on the old computer system 12. In one exemplary preferred embodiment of the present invention, the Mail object 66 includes configuration settings for Exchange, Outlook and Outlook Express, by Microsoft, Communicator, by Netscape Corporation of Mountain View, Calif., Pegasus, Eudora, and Lotus Notes, by IBM. However, more or fewer e-mail or communications programs could also be supported by the Mail object 66, and the present invention is not limited to the e-mail and communications programs listed.

Exemplary configuration settings included in the Mail object 66 are illustrated in Table 4. However, more or fewer configuration settings can also be used in the Mail object 66, and the present invention is not limited to the configuration settings illustrated in Table 4.

TABLE 4

Mail Object 66

E-mail, communication applications
    Express, Outlook, Outlook Express, Communicator, Pegasus, Eudora,
    Lotus Notes, etc.
Settings
    E-mail address identification, address books, inbox/outbox folders,
    mail folders, etc.
Meta Data
    Custom dictionaries, templates, macros, forms
Registry Settings The e-mail address identification in the Mail Object 66 includes addresses such as a Point-Of-Presence ("POP"), a Simple Mail Transfer Protocol ("SMTP") and other e-mail related addresses.

The Applications object 68 includes configuration settings of applications installed on the source computing system 12. For example, the applications may include Microsoft Word, Excel, Power Point, etc., applications in the Word Perfect Suite, by Corel and other applications from the source computing system 12.

Exemplary configuration settings included in the Application object 68 are illustrated in Table 5. However, more or fewer configuration settings can also be used in the Application object 68, and the present invention is not limited to the configuration settings illustrated in Table 5.

TABLE 5

Application Object 68

Application
    Word, Excel, Power Point, Word Perfect, etc.
Settings
    Dictionaries, style, formats, language, fonts, etc.
Registry Settings In one exemplary preferred embodiment of the present invention, the Application object 68 includes configuration settings for applications following design guidelines developed for Microsoft Windows operating system applications. However, other design guideline developed for applications for other operating systems, such as Linux, could also be used to determine which configuration settings are included in the Application object 68, and the present invention is not limited to an Application object 68 including configuration settings for just Microsoft Windows applications.

Exemplary Automatic Configuration Setting Translation

Returning to FIG. 3, at Step 48, multiple configuration settings are located on a source computing system using multiple transition rules from the Personality object 60 (FIG. 4). In one exemplary preferred embodiment of the present invention, the Extraction application 18 uses the Personality object 60 to locate configuration settings on the source computing system 12.

The locating Step 48 can also be used to locate configuration settings on more than one computer simultaneously (e.g., a desktop computer and a laptop computer). The User Interface application 20 is used to configure the Extraction application 18. The User Interface application 20 includes a list of "identity units" corresponding to configuration settings that will be extracted from the source computing system 12 and infused on the target computing system 26. The User Interface application 20 includes the ability to "drill-down" to multiple options and sub-options within an identity unit.

The User Interface application 20 configures the Extraction application 18 with the following options: 1.) what configuration settings to extract; 2.) where to store the results; 3.) at what level will the extraction take place; 4.) how the results are "tagged" for later retrieval; and 5.) how verbose or silent the extraction process is. However, more or fewer options could also be configured on Extraction application 18.

The "what to extract" option includes creating an Extraction plan. The Extraction plan identifies specific identity units that should be located and a list of options for each identity unit. The Extraction plan includes a full list of identity units to be located, an exclusion list and an inclusion list. The full list is a "vanilla" state that specifies all identity units known on the source computing system 12 that should be located and extracted. The Extraction plan may be modified by excluding one or more identity units from the full list. For example, if the full list included 250 identity units, an exclusion list could be used to exclude 50 identity units from the full list. If available, the Extraction application 18, uses the exclusion list instead of the full list to locate and extract configuration settings corresponding to the identity units from the source computing system 12 (e.g., at Steps 50 and 52 of Method 48).

The inclusion list allows a user to select any of the identity units from the full list. For example, if the full list included 250 identity units, a user may select only 30 identity units from the 250 available identity units. Thus, the only the 30 configuration settings from the inclusion list from the Extraction plan will marked as "active." The remaining 230 possible configuration settings are marked as "in-active" and are not used. If available, the Extraction application 18, uses the inclusion list instead of the full list to locate and extract the configuration settings corresponding to the identity units. If no exclusion list or inclusion list is created, the Extraction application 18, by default uses the full list to locate and extract configuration settings on the source computing system 12.

The User Interface 20 is also used to configure the Preparation application 22. The Preparation application 22 is configured in a similar manner to that described for the Extraction application 18. However, the Preparation application 22 includes a "Transition plan" instead of an Extraction plan. The Transition plan includes a full list, as a default list, and allows creation of exclusion and inclusion lists as was discussed for the Extraction plan.

Returning again to FIG. 3, at Step 50, multiple configuration settings are extracted from multiple locations on the source computing system by the Extraction application 18 using the Personality object 60. In one exemplary preferred embodiment of the present invention, the Extraction application 18 uses objects from the Personality object 60 and the Extraction plan described to produce "work product" that is stored in a pre-determined transition format at Step 52. In one exemplary preferred embodiment of the present invention, the work product is stored on the source computing system 12. In another exemplary preferred embodiment of the present invention, the work product is stored on one or more intermediate computing systems in volatile or non-volatile storage.

In one preferred embodiment of the present invention, the pre-determined transition format used to store the configuration settings is a database format for relational databases. However, non-relational database formats could also be used. In one preferred embodiment of the present invention, the pre-determined transition format is a database format for System Query Language ("SQL") databases. In another preferred embodiment of the present invention, the pre-determined transfer format is a database format for a Microsoft Access databases. However, other pre-determined transition formats can also be used and the present invention is not limited to the database formats described.

In one exemplary preferred embodiment of the present invention, the Extraction application 18 stores the configuration settings in a pre-determined transition format in temporary volatile storage (e.g., in RAM). In another exemplary preferred embodiment of the present invention, the Extraction application 18 includes a Loader application that is used to transfer data from temporary storage to the database 16. In such an embodiment, the Extraction application 18 does not maintain a persistent connection with the database 16. The transfer of information from temporary storage to the database 16 is accomplished with the Loader application. In yet another exemplary preferred embodiment of the present invention, the Extraction application 18 maintains a persistent connection with the database 16 and is capable of writing configuration settings in the pre-determined format directly into the database 16.

At Step 54, the multiple extracted configuration settings stored in the pre-determined transition format are manipulated. In a preferred embodiment of the present invention, the configuration settings are manipulated with the Preparation application 22 using the Transition plan described above. For example, the Extraction application 18 may extract 250 configuration settings from the source computer with an exemplary Extraction plan that included only a full list (i.e., no extraction list or inclusion list). An exemplary Transition plan may include only an inclusion list. The exemplary inclusion list may include only 30 of 250 possible configuration settings from the Extraction plan. Thus, only the 30 configuration settings from the inclusion list from the Transition plan will be marked as "active" in the pre-determined transition format by the Preparation application 22. The remaining 220 possible configuration settings are marked as "in-active" by the Preparation application 22 and are not used. Various combinations of full lists, exclusion lists, inclusion lists, from the Extraction plan and Transition plan can be used, and the present invention is not limited to this example.

The manipulation at Step 54 also includes transitioning one or more configuration settings from a format used on the source computing system to a format used on the target computing system. For example, a configuration setting for a computer monitor may be stored with the name config-monitor-old on the source computer system. However, on the target computer system, the same configuration setting may be stored with a name config-monitor-new. In addition, a configuration setting may be stored in a first directory-A on the source system, and in a second directory-B, on the target system. The preparation application 22 handles such transitions at step 54.

At Step 56, a transition package is created from the multiple manipulated configuration settings. In an exemplary preferred embodiment of the present invention, the Preparation application 22 creates a transition package. In one exemplary preferred embodiment of the present invention, the transition package includes a list of commands along with necessary source data for the manipulated configuration settings. The list of command may be used to provide an ordering for transitioning the configuration settings. However, other transition package formats could also be used and the present invention is not limited to the transition packages described. The transition package will be used by the Injection application 24 to transition the desired configuration settings from the source computing system 12 the target computing system 26.

In an exemplary preferred embodiment of the present invention, the transition package is stored in the database 16 by the Preparation application 22. In another exemplary preferred embodiment of the present invention, the transition package is also transferred directly to the Injection application 24. In yet another exemplary preferred embodiment of the present invention, the transition package is read from the database 16 by the Preparation application 22 and the Injection application included in at a later time.

Applying a Transition Package to a Target Computing System

FIG. 5 is a flow diagram illustrating a Method 70 for automatically applying transition configuration settings. At Step 72, a transition package is received on a target computing system from a source computing system. At Step 74, the transition package is infused on the target computing system to automatically transition manipulated configuration settings from the source computing system to the target computing system. At Step 76, transition package is optionally verified on the target computing system to ensure that the transition package has been correctly applied to the target computing system.

In one exemplary preferred embodiment of the present invention, the transition package is sent from the Preparation application 22 on the source computing system 12 within an Injection application 24 to the target computing system 26. The Injection application 24 with the transition package can be sent to the target computing system 26 via on a floppy disk, zip-disk, or CD-ROM, or transferred using e-mail, TCP/IP, FTP, or with other network transfer mechanisms. At Step 72, the target computing system 26 receives the Injection application 24 with the transition package from the source computing system 12. As was described above, in one exemplary preferred embodiment of the present invention, the transition package includes a list of commands along with necessary source data for multiple manipulated configuration settings. At Step 74, an Injection application 24 "infuses" the target computing system 26 with manipulated configuration settings from the source computing system 12. The Injection application 24 reads and executes the list of commands from the transition package to transition configuration to the target computing system 26. The Injection application 24 is invoked by the operating system 34 on the target computing system. At Step 76, transition package is optionally verified on the target computing system 26 to ensure that the transition package has been correctly applied to the target computing system 26. In one exemplary preferred embodiment of the present invention, the Injection application 24 also verifies the injection of the transition configuration settings on the target computing system 26. In another exemplary preferred embodiment of the present invention, a separate Verification application verifies configuration settings infused by the Injection application 24.

Exemplary Automatic Transition of Configuration Settings

Figure 6A:
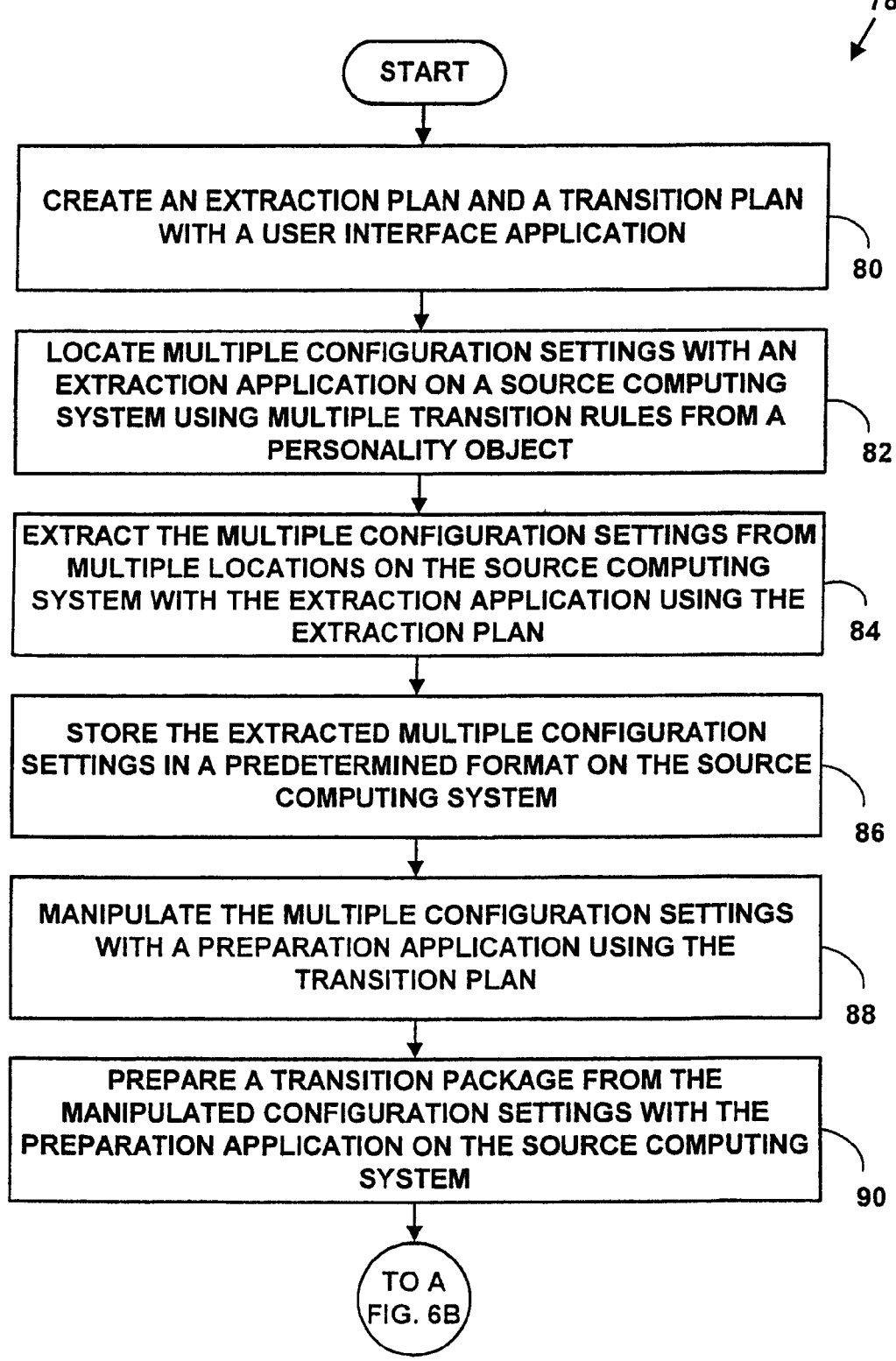

FIGS. 6A and 6B are flow diagram 78 illustrating one exemplary method for automatically transitioning configuration settings for one exemplary preferred embodiment of the present invention. However, the present invention is not limited to this exemplary embodiment and other embodiments could also be used. At Step 80 of FIG. 6A, an Extraction plan and a Transition plan are prepared with the User Interface application 20. At Step 82, multiple configuration settings are located on a source computing system 12 with an Extraction application 18 using a Personality object 58. At step 84, the multiple configuration settings are extracted from multiple locations on the source computing system 12 with the Extraction application 18 and the Extraction plan. At Step 86, the multiple extracted configuration settings are stored in a database format on the source computing system 12. At Step 88, the multiple extracted configuration settings are manipulated with a Preparation application 22 and the Transition plan. At Step 90, a transition package is prepared from the multiple manipulated configuration settings by the Preparation application 22. The transition package is used to transition configuration settings from the source computing system to the target computing system 26.

At Step 92 of FIG. 6B, an Injection application 24 including the transition package is prepared by the Preparation application 22. The Injection application 24 uses the transition package to transition configuration settings from the source computing system to the target computing system. At Step 94, the Injection application 24 including the transition package is sent from the source computing system 12 to the target computing system 26.

At Step 94, the Injection application including the transition package is received on the target computing system 26 from the source computing system 12. At Step 98, the transition package is infused with the Injection application 24 on the target computing system 26 to transition configuration settings from the source computing system 12 to the target computing system 26. At Step 100, configuration settings from the transition package are optionally verified with the Injection application 24 to ensure that the transition package has been correctly applied to the target computing system.

Data Flow for Exemplary Automatic Transition of Configuration Settings

FIG. 7 is a block diagram illustrating a data flow 102 for the automatic configuration setting transition from FIGS. 6A and 6B. The User Interface application 20 is used to create 104 an Extraction plan and a Transition plan (e.g., Step 80 of FIG. 6A). The Extraction application 18 locates and extracts 106 multiple configuration settings from multiple locations on the source computing system using the Personality object 58 and the Extraction plan (e.g., Steps 82 and 84). The multiple extracted configuration settings are stored 108 in a pre-determined transition format in temporary storage on the source computing system 12 (e.g., Step 86). The multiple extracted configuration settings may also be stored 110 in persistent storage in the database 16. The Preparation application 22 manipulates 112 the multiple extracted configuration settings stored in the pre-determined transition format using the Transition plan (e.g., Step 88). The Preparation application 22 creates 114 a transition package from the multiple manipulated configuration settings. The transition package includes the multiple manipulated configuration settings (e.g., Step 90).

As was discussed above, the transition package can be stored 116 in the database 16 by the Preparation application 22. The transition package can also be transferred directly to the Injection application 24. The transition package can also be read from the database 16 by the Preparation application 22 and sent to the Injection application 24 at a later time. The Preparation application 22 prepares 118 an Injection Application 24 including the transition package (e.g., Step 92, FIG. 6B). The Injection Application 24 is sent 120 from the source computing system 12 to the target computing system 26 (e.g., Step 94).

The target computing system 26 receives the injection application 24 with transition package from the source computing system 12 (e.g., Step 96). The Injection application 24 "infuses" 122 the target computing system 26 with manipulated configuration settings in the transition package from the source computing system 12 (e.g., Step 98). The Injection application 24 reads and executes the list of commands from the transition package to transition configuration to the target computing system 26. The transition package is optionally verified 124 on the target computing system 26 to ensure that the transition package has been correctly applied to the target computing system 26 (e.g., Step 100).

Exemplary Automatic Transition Products

In one exemplary preferred embodiment of the present invention, the Extraction application 18, the User Interface application 20, the Preparation application 22 and the Injection application 24 are Windows 32-bit ("Win32") applications written in C++ and Visual Basic. However, the present invention is not limited to Win32 applications, and other types of applications can also be used. In addition, other programming languages could also be used to implement the transition applications. The transition Win32 applications support the exemplary transition illustrated in Table 6. However, the present invention is not limited to the transitions illustrated in Table 6, and other transitions could also be made between a source computing system and a target computing system.

TABLE 6

Windows 95 ver. X to Windows 95 ver. Y
Windows 95 to Windows 98
Windows 98 ver. X to Windows 98 ver. Y
Windows 95 to Windows NT
Windows 98 to Windows NT
Windows NT ver. X to WindowS NT ver. Y
Windows XX to Windows YY
Windows XX ver. X to Windows YY ver. Y In one exemplary preferred embodiment of the present invention, the present invention may also include the transition of configuration settings to a target computing system that are NOT present on a source computing system, but were calculated from other settings on the source computing system. Such an embodiment can be inclusive such that "old settings" as well as "new calculated settings" are injected. The translation process may also be exclusive such that a target computing system does not receive any "old settings" but only new settings "calculated" from the old settings on a source computing system. The translation process may also be used for extracting configuration settings from multiple source computing systems that are local or remote, and "conglomerating" them onto a single target computing system.

In another exemplary preferred embodiment of the present invention, configuration settings can be transitioned without any transition data ever being embodied into a persistent storage medium. In such an embodiment, extracted transition data is transmitted via a data stream over a network and is consumed (i.e., processed and or injected) without ever being stored in a persistent storage medium.

In yet another exemplary preferred embodiment of the present invention, a target computing system can be infused with configurations settings that have not originated from a source computing system and have not been calculated from old configuration settings on the source computing system. In such an embodiment, a new target computing system is built and configuration settings are from a "newly developed" source that is not a source computing system (e.g., a proposed new operating system or proposed new computer hardware).

In yet another embodiment of the present invention, the transitioning process may also take settings from a single source computing system and "distribute" them to multiple target computing systems such that only a subset of the settings from the source computing system reside on any one target computing system. The subsets of transition data may overlap or be exclusive.

In yet another embodiment of the present invention, the transition process may take configuration settings from multiple source computing systems and inject them onto multiple target computing systems, but in a manner such that there is no correlation between the configuration settings from the source computing systems and target computing systems the configuration settings are injected onto. For example, three configuration settings from a first source computing system are transitioned to a first set target computing systems, while one configuration setting from a second source computing system is transitioned to a second set of target computing systems not including the first set of target computing systems.

The methods and system described herein provide an automated transition process for transition configuration settings from a target computing system to a host computing system. The method and system may vastly reduce transition, configuration and deployment times for service providers, corporations, and end-users for transitions from a target computing system to source computing system. The method and system may also save time, resources, improve transition quality, and lower user frustration.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

We claim:

1. A method in a computer system for preparing and transferring configuration settings from a source computing system to a target computing system, the method comprising:

provuing information about configuration settings on the source computing system, the information including a location of each configuration setting;

generating an extraction plan that identifies configuration settings to be extracted from the source computing system, the generating including providing a list of configuration settings known to the source computing system and including identifying active configuration settings out of the provided list of configuration settings to be extracted from the source computing system;

extracting the active configuration settings of the extraction plan from the source computing system, the extracted configuration settings being located using the provided information;

generating a transition plan that identifies configuration settings to be transferred from the source computing system to the target computing system, the generating including providing active configuration settings of the extraction plan and including identifying from the active configuration settings of the extraction plan active configuration settings to be transferred from the source computing system to the target computing system; and for each active configuration setting of the transition plan, retrieving the extracted configuration settings identified as active configuration settings of the transition plan; and transferring one or more of the retrieved configuration settings from the source computing system to the target computing system.

* * * * *